United States Patent [19]
Kinsel et al.

[11] 3,896,363
[45] July 22, 1975

[54] FEEDBACK CIRCUIT FOR DETECTING THE FAILURE OF A STEPPING MOTOR TO RESPOND TO THE CONTROL CIRCUIT

[75] Inventors: Robert Carl Kinsel; Robert Nick Magee, both of Cincinnati, Ohio

[73] Assignee: Cincinnati Milacron Inc., Cincinnati, Ohio

[22] Filed: Mar. 18, 1974

[21] Appl. No.: 451,775

[52] U.S. Cl. .............. 318/685; 318/696; 318/326; 318/490
[51] Int. Cl.² .......................................... G05B 19/40
[58] Field of Search ........... 318/685, 696, 326, 490

[56] References Cited
UNITED STATES PATENTS

| | | | |
|---|---|---|---|
| 3,324,369 | 6/1967 | Marlcakis | 318/696 |
| 3,353,076 | 11/1967 | Haines | 318/696 |
| 3,359,474 | 12/1967 | Welch et al. | 318/696 |
| 3,435,314 | 3/1969 | Bradley et al. | 318/685 |
| 3,636,429 | 1/1972 | Jakabowski | 318/696 |
| 3,659,175 | 4/1972 | Sordello | 318/696 |
| 3,736,488 | 5/1973 | Abraham | 318/696 |

OTHER PUBLICATIONS

IBM Tech. Disclosure Bulletin, Vol. 16, No. 1, June 1973.

*Primary Examiner*—G. R. Simmons

[57] ABSTRACT

An apparatus is disclosed for monitoring the motion of a stepping motor in response to input drive pulses from a control circuit. A velocity transducer is coupled to the stepping motor and produces a velocity and feedback signal. A logic circuit is responsive to the input drive pulses and the velocity feedback signal and produces an error signal in response to the stepping motor failing to respond to the input pulses.

4 Claims, 2 Drawing Figures

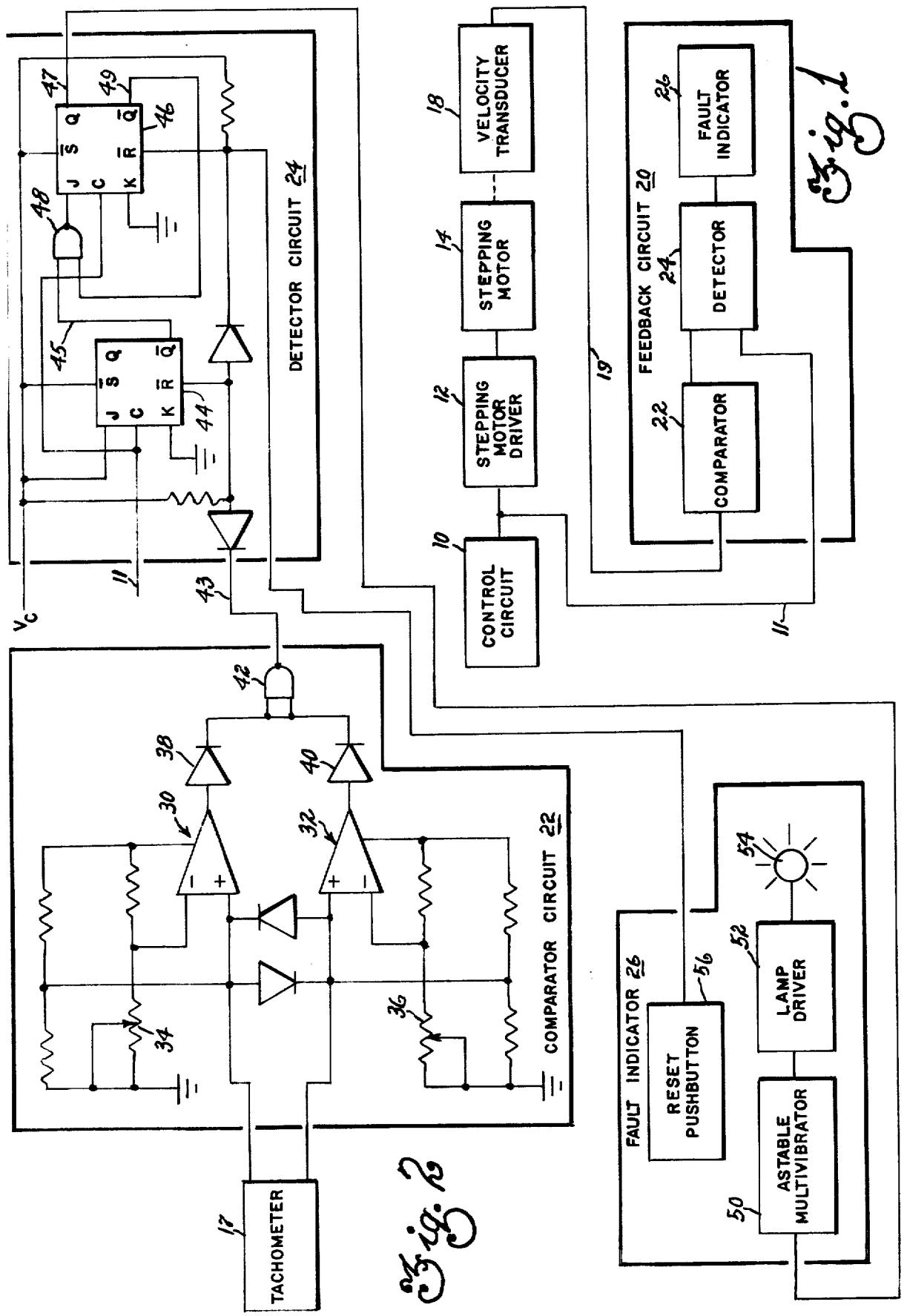

FEEDBACK CIRCUIT FOR DETECTING THE FAILURE OF A STEPPING MOTOR TO RESPOND TO THE CONTROL CIRCUIT

BACKGROUND OF THE INVENTION

The invention relates generally to stepping motor controls; and specifically, the invention provides an inexpensive and reliable apparatus for monitoring stepping motor motion and providing an error signal upon the stepping motor failing to respond to an input signal.

There is a wide variety of stepping motor controls shown in the art. Further, there are many controls which employ feedback circuits to determine the actual response of the motor to input signals. However, the feedback controls fall into two general categories.

The first category of feedback circuits are comprised of apparatus for sensing the change in motor coil current when the stepping motor is moving. Since current is always flowing through the motor coils whether or not the motor is moving, the feedback circuit must detect the difference in current signal characteristics when the motor is rotating. The problem may be further complicated by other control circuitry which, for example, may be used to increase the torque of the stepping motor. Circuits of this type also change the current signal characteristics in the motor coil. Further, the feedback circuit must be operative over the full velocity range of the stepping motor. Therefore, feedback circuits which detect stepping motor motion by sensing motor coil current are inherently complicated and expensive.

The second general category of feedback controls are those which use a position feedback device. A typical feedback device shown the prior art is an optical transducer which modulates an optical signal by means of a slotted disc coupled to the stepping motor. The feedback circuit provides electrical pulses in response to changes in position of the stepping motor. Position transducers of this nature have a number of problems in their application. First, to obtain the best reliability, the coupling of these devices to the stepping motor is very critical. Second, these feedback devices are adversely affected by the heat generated by the stepping motor. Third, at low velocities, the stepping motor greatly overshoots each step position and oscillates about the position in an underdamped manner. Consequently, the feedback circuits must be able to discriminate between the actual change in position and the overshoot. To overcome the above disadvantages, a relatively expensive and complicated circuit is required.

From a review of the prior art, it is apparent that the stepping motor feedback circuits disclosed therein are for the purpose of detecting each change in position of the stepping motor. However, there are a great many applications where it is not necessary to detect a change in position, but it is only required to determine whether or not the stepping motor is moving. Once a loss of motion is detected a remedial action may be taken.

An example of such an application is a grinding machine infeed control. A grinding cycle is typically comprised of several steps. The first step is a rapid feed of the grinding wheel relative to the workpiece, which is followed by a slow machining infeed during which the wheel is in contact with the workpiece. After the part is ground to size, the wheel is retracted from the workpiece. In many grinding machines, the rapid infeed to the workpiece is under hydraulic motor control; and the slower machining infeed is controlled by a stepping motor. After the part is ground to size, the stepping motor then rapidly retracts the wheel from the workpiece an amount approximately equal to the grinding infeed. After this, the hydraulic motor completes the retraction cycle at a rapid rate.

At the slower grinding infeed velocities, the stepping motor responds very reliably to its input signals. However, during the rapid retraction by the stepping motor, if the stepping motor fails to respond to an input signal, it comes to a complete stop. This response is an inherent characteristic of the stepping motor. Since the length of travel of the grinding wheel while under the control of the stepping motor is in the range of 0.040 inches, it is almost impossible for an operator to detect whether the grinding wheel has retracted the full amount or has stopped midway in the retraction cycle. If the stepping motor stops in the middle of its rapid retract cycle and this error goes undetected, the subsequent machining feed stroke will be erroneously performed thereby causing a subsequent part to be scrapped.

In an application as described above, applicant proposes a simple inexpensive feedback circuit which detects an improper stopping of the stepping motor and produces a signal indicating the error condition.

SUMMARY OF THE INVENTION

According to one embodiment of the invention, an apparatus is provided for detecting the failure of a stepping motor to respond to input pulses generated by a control circuit. A first means is mechanically connected to the stepping motor for providing an output signal as a function of the rotational velocity of the stepping motor. Second, a circuit means is responsive to the output signal for producing a feedback signal. Next, a detecting means is responsive to the input pulses from the control circuit and the feedback signal and generates an error signal in response to the absence of an intervening feedback signal between at least two of the input pulses.

BRIEF DESCRIPTION OF THE DRAWINGS

FIG. 1 is a general block diagram illustrating the invention.

FIG. 2 is a detailed schematic diagram of several elements of the invention.

DESCRIPTION OF THE PREFERRED EMBODIMENT

FIG. 1 is a general block diagram illustrating the invention. A control circuit 10 containing an oscillator or similar device produces a number of input pulses to a stepping motor driver 12. The input pulses are produced in response to input numerical information or by other means which are well known in the art. The generation of the input pulses forms no part of the present invention and therefore will not be shown in any further detail. The stepping motor driver is responsive to the input pulses for producing a number of signals to energize the stepping motor 14. The stepping motor is mechanically connected to the controlled element (not shown) which moves as a function of the input pulses to the stepping motor driver 12. A velocity transducer 18 is also coupled to the stepping motor 14 and produces an analog output signal as a function of the velocity of the stepping motor. A feedback circuit 20 is responsive to the input pulses from the control circuit 10 and the output signal from the velocity transducer 18 to detect a failure of the stepping motor to respond to the input pulses. Within the feedback circuit 20, a comparator 22 is responsive to the output signal from the velocity transducer 18 to produce a feedback signal as a function thereof. A detector circuit 24 is responsive to the feedback signal and the input pulses to produce an error signal in response to the absence of an intervening feedback signal between two consecutive input pulses. A fault indicator 26 is responsive to the error signal to produce an alarm or warning that an error has occurred. This alarm may be embodied by an audio or visual alarm device, a combination thereof or any other well known alarm system.

FIG. 2 is a detailed schematic diagram illustrating the basic elements of the invention. The comparator circuit 22 is comprised of first and second operational amplifier circuits 30 and 32 respectively. The velocity transducer 18 may typically be a commercially available D.C. tachometer which is relatively inexpensive when compared to a typical position transducer. The tachometer produces an analog output signal having a voltage magnitude proportional to the angular velocity of the stepping motor. The polarity of the voltage magnitude will change as a function of the direction of rotation. Therefore, the comparator circuit 22 must be sensitive to different polarities of the output signal from the tachometer. Further, the circuit must be capable of separating the output signal at lower angular velocities from the inevitable noise signals that enter the circuit.

The amplifier circuit 30 is responsive to an output signal of one polarity for comparing the magnitude of the output signal to a predetermined reference magnitude. The predetermined reference magnitude may be varied by the potentiometer 34. When the output signal exceeds a value equal to the predetermined reference, the amplifier circuit 30 switches and produces a signal on an output thereof. In a similar manner, the amplifier circuit 32 is responsive to output signals from the tachometer of the opposite polarity. The circuit is operative to compare the magnitude of the output signal to a predetermined reference signal which may be changed by varying the potentiometer 36. When the second output signal exceeds the magnitude of the second reference signal, the amplifier 32 switches state and produces a signal on an output thereof. The output of the amplifier circuits 30 and 32 are connected together through diodes 38 and 40 and are joined together on the inputs of a gating circuit 42. The gating circuit 42 is a NAND gate which is operative to provide an appropriate signal on line 43 to drive the elements in the detector circuit 24.

The detector circuit 24 is comprised of flip-flops 44 and 46 and a gating circuit 48. The flip-flop 44 has a clock or trigger input responsive to the input pulses on line 11 from the control circuit 10. In response to an input pulse from the control circuit 10, the flip-flop 44 triggers and produces a control signal on its output 45. The stepping motor moves in response to the input pulse, and the tachometer produces an output signal as a function of the velocity thereof. The comparator circuit 22 receives the velocity signal and produces a corresponding feedback signal on line 43. The feedback signal is connected to the reset input of the flip-flop 44 and is operative to terminate the presence of the control signal on the flip-flop output.

At high velocities of either polarity, the output signal from the NAND gate 42 will appear as a low constant voltage level. Consequently, the feedback signal will hold the flip-flop 44 constantly reset. If an error condition occurs and the stepping motor fails to respond to a particular input pulse, the feedback signal will not terminate the control signal on the output of the flip-flop 44. At this point in time, the flip-flop 46 has no signal on its output, and the gating circuit 48 which is comprised of a second NAND gate passes a signal from the output of flip-flop 44 to the input of flip-flop 46. Upon the occurrence of a successive input pulse, which is connected to the clock or trigger input of the flip-flop 46, an error signal will be generated on the output 47 of the flip-flop 46. This error signal represents a loss of stepping motor motion. The output 49 of the flip-flop 46 is connected to the gating network 48 and is operative to latch the error signal in the event that the flip-flop 44 is reset.

The error signal on output 47 is an input to the fault indicator 26. As discussed earlier, there are many commercially available alarm mechanisms, and the disclosure of a particular alarm mechanism is not to be considered a limitation on the present invention. The fault indicator 26 is comprised of an astable multivibrator 50, a lamp driver 52 and a lamp 54. The error signal energizes the astable multivibrator 50 which is operative to periodically drive the lamp driver over a period of time. This periodic drive causes the lamp 54 to operate in a flashing manner. Consequently, if the stepping motor fails to respond to an input pulse and physically terminates its motion, the detector circuit is operative to produce an error signal which energizes an alarm. As will be appreciated by those skilled in the art, the error signal may also be coupled to other elements in the control circuit to prohibit a subsequent initiation of another cycle of operation. After the operator has taken the remedial action necessary, he may then energize a reset push button 56 which is operative to reset the flip-flops 44 and 46, thereby terminating the error signal.

While the invention has been illustrated in some detail, according to the preferred embodiment shown in the accompanying drawings and while the preferred illustrated embodiment has been described in some detail, there is no intention to limit the invention to such detail. On the contrary, it is intended to cover all modifications, alterations and equivalents falling within the spirit and scope of the appended claims.

What is claimed is:

1. An apparatus for detecting the failure of a stepping motor to respond to input pulses generated by a control circuit, the apparatus comprising:
   a. a velocity transducer in mechanical communication with the stepping motor for providing a first output analog signal in response to the stepping motor rotating in one direction and a second output analog signal in response to the stepping motor rotating in an opposite direction;
   b. means connected to the velocity transducer for producing an analog feedback signal in response to the output analog signals;
   c. means responsive to the input pulses and the analog feedback signal for generating an error signal in response to the presence of the input pulses and the absence of corresponding analog feedback signals; and d. means responsive to the error signal for producing an indication of an error condition.

2. The apparatus of claim 1, wherein the means for producing the feedback signal further comprises:
   a. means connected to the transducer for comparing the first and second analog output signals to corresponding first and second reference signals and producing first and second signals as a function thereof; and
   b. means connected to the comparing means for gating the first and second signals to produce the feedback signal.

3. The apparatus of claim 2, wherein the means for generating the error signal further comprises:
   a. means for producing a control signal in response to the occurrence of an input pulse and terminating the control signal in response to a subsequent feedback signal; and
   b. means responsive to the control signal for generating the error signal in response to the subsequent occurrence of an input signal without an intervening occurrence of the feedback signal.

4. An apparatus for detecting the failure of a stepping motor to respond to input pulses generated by a control circuit, the apparatus comprising:
   a. a tachometer connected to the stepping motor for providing a positive voltage level in response to the motor rotating in one direction and a negative voltage level in response to the motor rotating in the opposite direction;
   b. a first amplifier circuit connected to the tachometer for producing a first analogue signal in response to the magnitude of the positive voltage level exceeding the magnitude of a first reference signal;
   c. a second amplifier circuit connected to the tachometer for producing a second analogue signal in response to the magnitude of the negative voltage level exceeding the magnitude of a second reference signal;
   d. a gating network connected to the amplifier circuits for producing an analogue feedback signal in response to each occurrence of the first and second analogue signals;
   e. a first logic circuit having a first input responsive to the input pulses and a reset input responsive to the feedback signal, said logic circuit generating a control signal in response to each input pulse and terminating the control signal in response to a corresponding feedback signal;
   f. a second logic circuit having a first input responsive to the control signal, a second input responsive to the input pulses and a reset input, said second logic circuit generating an error signal in response to the simultaneous presence of a control signal and an input pulse; and
   g. means responsive to the error signal for producing a fault indication of an error condition, said means including means connected to the reset inputs of the logic circuits for manually producing a reset signal to terminate the error signal.

* * * * *